United States Patent Office 3,512,213
Patented May 19, 1970

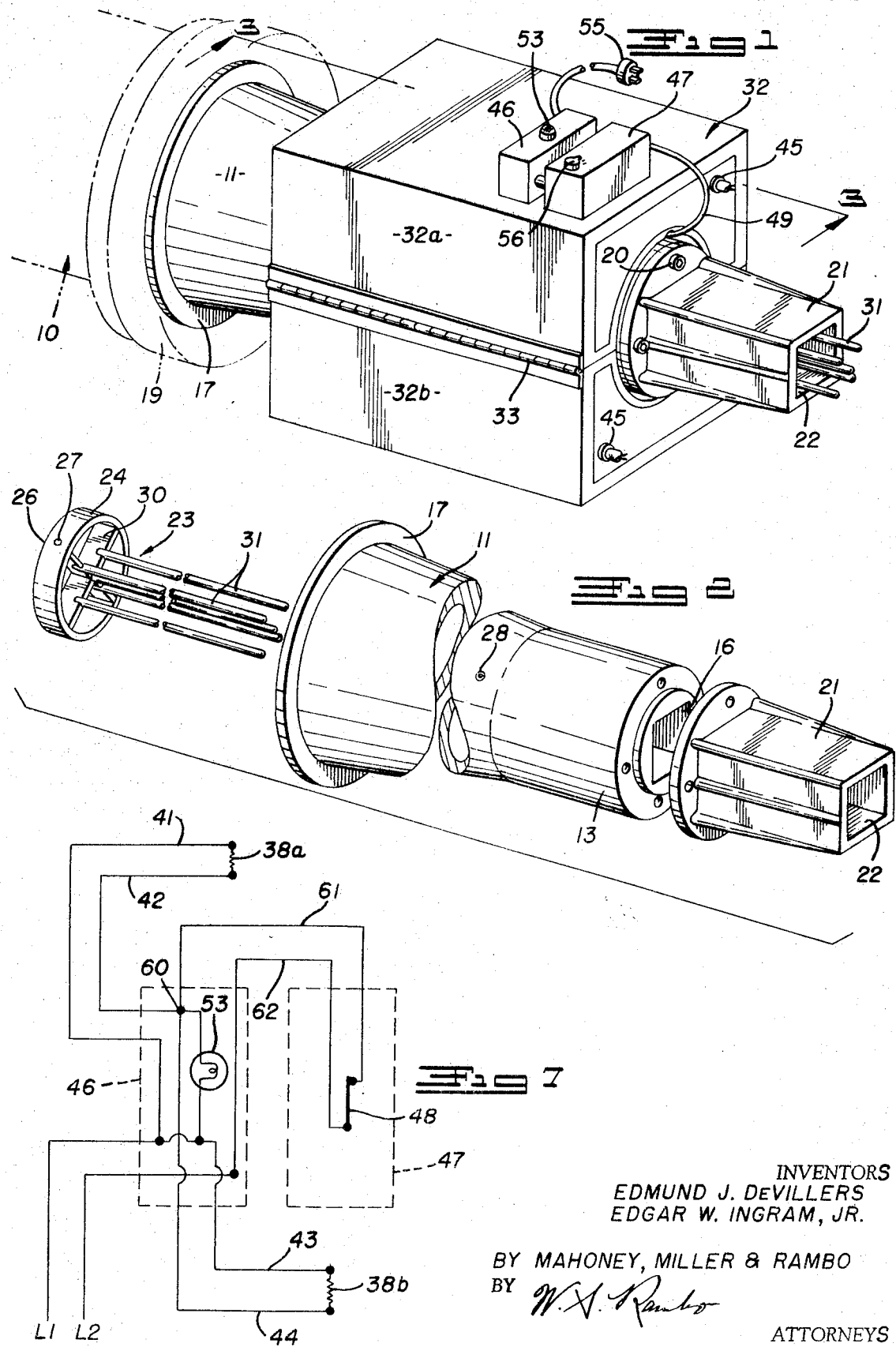

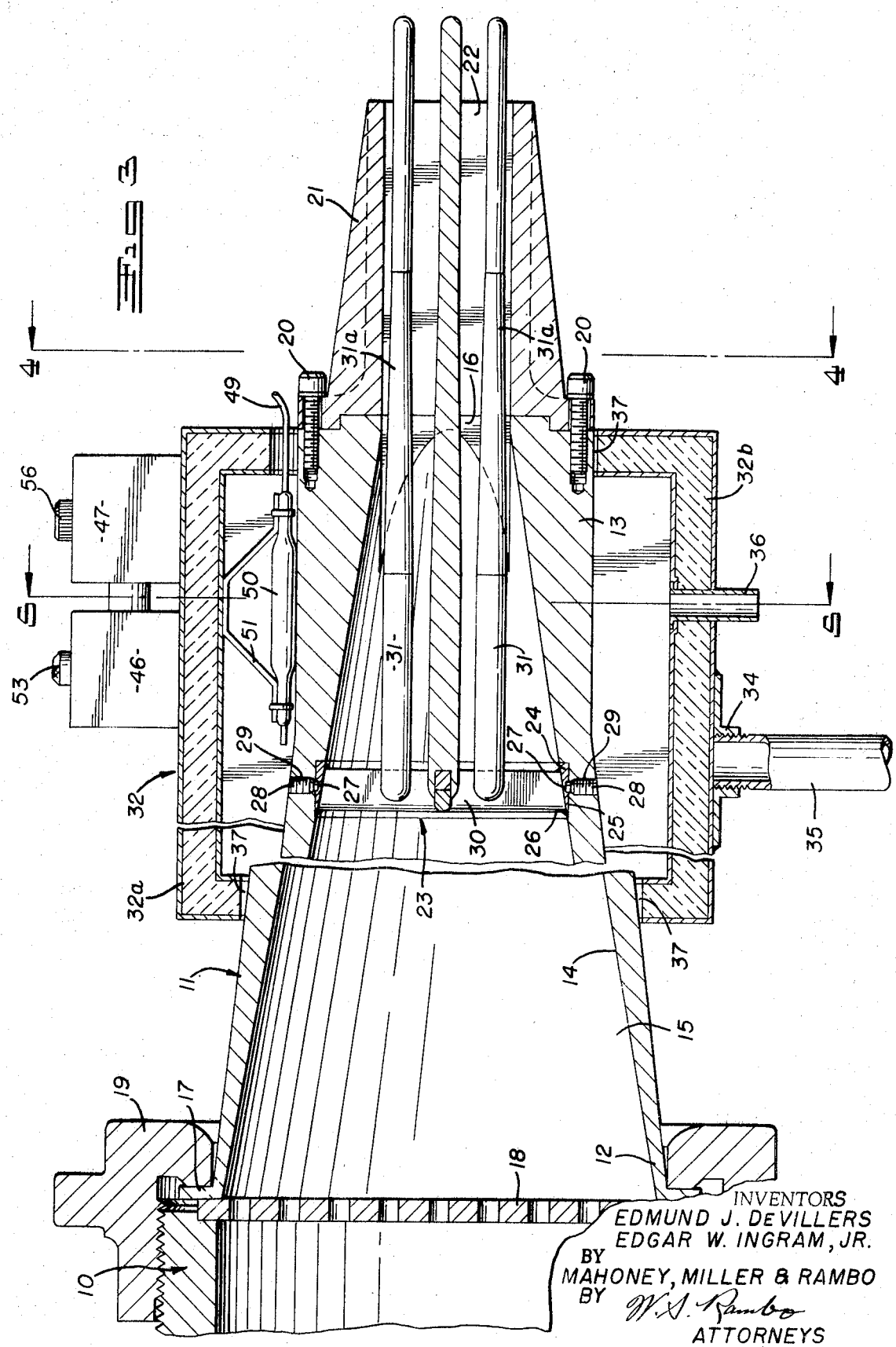

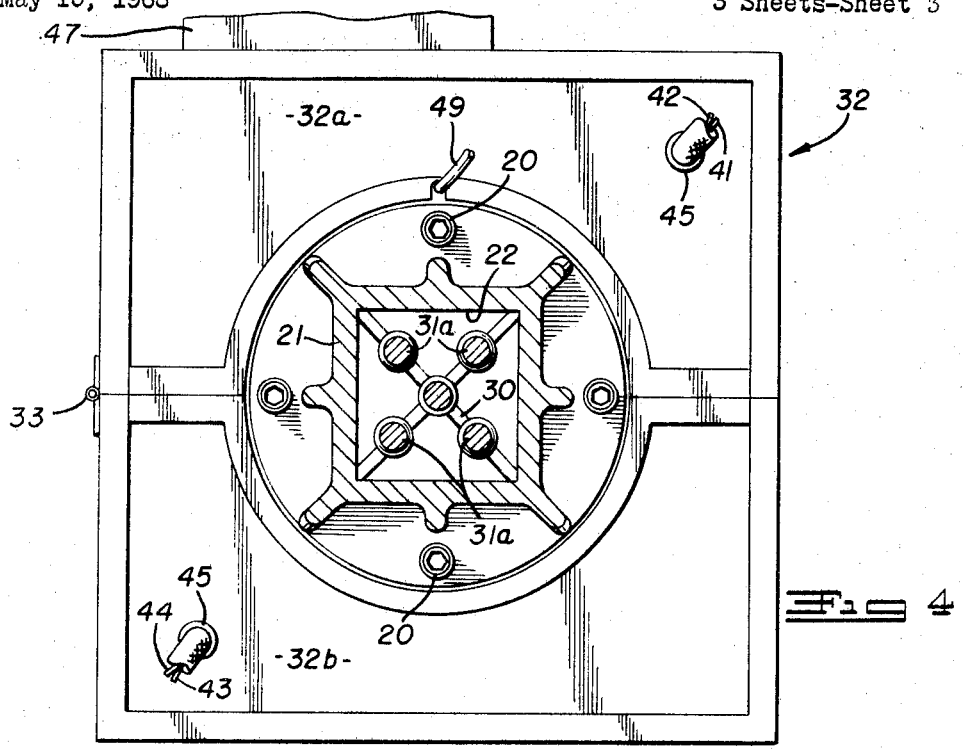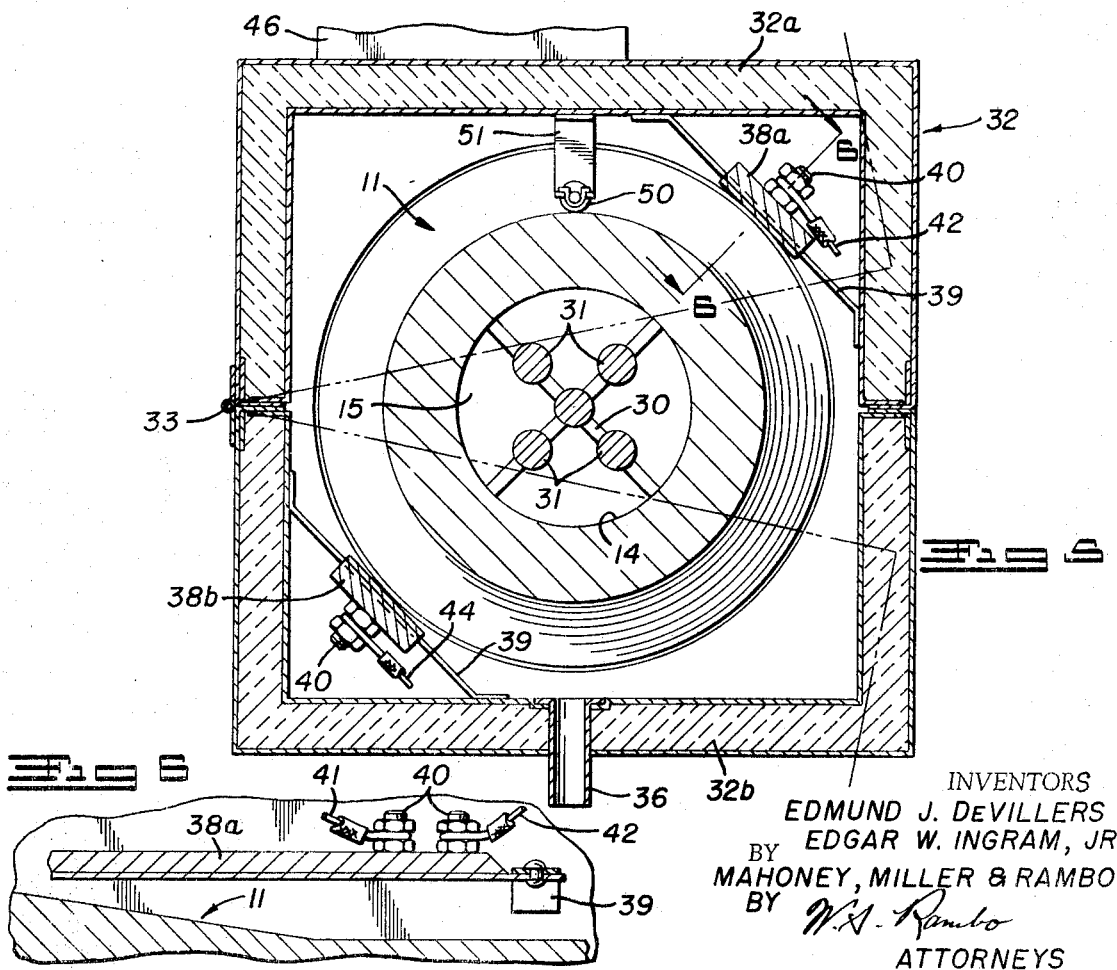

3,512,213
EXTRUSION NOZZLE FOR A MEAT GRINDER
Edmund J. De Villers, Columbus, and Edgar W. Ingram, Jr., Worthington, Ohio, assignors to White Castle System, Inc., Columbus, Ohio, a corporation of Delaware
Filed May 15, 1968, Ser. No. 729,324,
Int. Cl. A22c 7/00
U.S. Cl. 17—32                                   6 Claims

ABSTRACT OF THE DISCLOSURE

An electrically heated extrusion nozzle for attachment to a meat grinder and for forming ground, semi-frozen meat discharged from the meat grinder into a continuous, longitudinally perforated column, and wherein the nozzle is of sectional, knock-down construction to facilitate cleaning and sanitizing.

BACKGROUND OF THE INVENTION

This invention relates generally to apparatus for forming or shaping semi-frozen ground meat. More particularly, this invention deals with an electrically heated extrusion nozzle for attachment to the discharge end of a meat grinding machine and which is operable to form or shape the ground meat discharge from the grinding machine into a continuous, longitudinally perforated column of square or rectangular cross-sectional configuration. The extruded column of meat is then in condition to be cut transversely into individual meat patties, quick frozen and packaged for storage and/or shipment.

In the commercial manufacture of ground beef patties to be used by restaurants in making hamburger sandwiches, it has been found advantageous to form the patties with one or more perforation or holes extending through the thickness of the patty. Such perforations or holes provide more efficient and uniform heat transfer during subsequent freezing and cooking of the patty. Also, it is desirable that the freshly ground meat be quickly frozen immediately following its formation into patties, packaged, and maintained at sub-freezing temperatures until cooking. This general method of producing ground beef patties is described and claimed in U.S. Pat. No. 2,670,-296, issued Feb. 23, 1954 to L. R. Tansley and assigned to the assignee owner of the present application.

In the practice of the method described in the aforementioned patent, the influent raw meat was ground and extruded at temperatures slightly above freezing. However, it has since been found highly desirable to maintain the influent meat at temperature slightly below the freezing point (28°–30° F.) during grinding and extrusion to prevent bacterial growth and possible contamination. Following the grinding of the meat, it is immediately forced through an extrusion nozzle to form it into a continuous column having the desired cross-sectional shape, and the desired number and location of perforations or holes. As will be readily understood, the meat, during extrusion, is subjected to relatively extreme forces or pressures, and due to the relatively reduced temperature thereof, particles of meat tend to adhere and stick to the interior surfaces of the extrusion nozzle, and particularly so in the area of any cracks, crevices, or protuberances. This greatly increases the amount of friction generated during passage of ground meat through the extrusion nozzle, and consequently the amount of power consumed in the extrusion operation. Further, in order to form the perforations or holes in the extruded column of meat, the extrusion nozzle was usually provided with one or more longitudinally extending cores or mandrels which were supported upon a suitable spider frame wielded or otherwise permanently connected to the extrusion nozzle.

In the past, considerable difficulty was encountered with prior art types of unitary extrusion nozzles, due to the extreme pressures involved, and the tendency of such nozzles to trap meat particles within their structure and thereby increase frictional forces and generally complicate the extrusion process. Also, when attempts were made to extrude the ground meat at freezing or sub-freezing temperatures, frost tended to build up upon the interior surface of the extrusion nozzle and thus cause meat particles to adhere to and coat such inner surfaces, thereby increasing frictional resistance with the nozzle. Furthermore, the unitary construction of these prior art extrusion nozzles made them extremely difficult to clean and maintain in sanitary condition.

SUMMARY AND OBJECTS OF THE INVENTION

Accordingly, it is the principal object of this invention to provide an improved, electrically heated extrusion nozzle which is so constructed as to reduce to a minimum the frictional resistance offered to the passage of ground meat through the nozzle, and wherein the nozzle is constructed in sectional, knockdown form so as to be readily disassembled for cleaning and maintenance.

It is another object of this invention to provide an extrusion nozzle of the type heretofore described with an electrically energized heater in the form of a sectional outer casing which is adapted to fit around and over the intermediate portion of the extrusion nozzle and transmit heat thereto during the extrusion operation so as to prevent frosting of the extrusion nozzle and the consequent undesired adherence of meat particles to the interior surfaces of the extrusion nozzle.

For a further and more detailed understanding of the present invention and the various additional objects and advantages thereof, reference is made to the following description and the accompanying drawing, wherein:

FIG. 1 is a perspective view of an electrically heated extrusion nozzle according to the present invention;

FIG. 2 is an exploded perspective view of the several component parts of the extrusion nozzle;

FIG. 3 is a medial, longitudinal, vertical sectional view taken through the extrusion nozzle along a plane indicated generally by the line 3—3 of FIG. 1;

FIG. 4 is a transverse vertical sectional view taken along the line 4—4 of FIG. 3;

FIG. 5 is a similar view taken along the line 5—5 of FIG. 3;

FIG. 6 is a detailed, fragmentary sectional view taken through one of the electrical heating bars, along the line 6—6 of FIG. 5; and FIG. 7 is a diagram of the electrical control circuit for the nozzle heater.

Referring now to the drawings, the numeral 10 indicates generally the discharge end portion of a power-driven meat-grinding machine to which the present extrusion nozzle is connectable. As shown more particularly in FIG. 3, the extrusion nozzle comprises an elongated, hollow, horn-shaped outer casing 11 formed to provide a diametrically enlarged inner end portion 12 and a relatively reduced diameter outer end portion 13. The outer casing 11 is also formed with an inner wall 14 which defines an internal, generally frusto-conical passage or chamber 15 extending axially from end to end of the casing. The passage or chamber 15 of the casing 11 is circular in cross-section for substantially its entire length, but terminates at the outer end of the casing in an outlet 16 of rectangular or square cross-sectional configuration. The outer casing 11 is formed adjacent its wider inlet end with a diametrically enlarged mounting flange 17 which is arranged to be detachably clamped to the discharge end 10 of the grinding machine by means of the usual screw-threaded, annular clamping nut or collar 19 of the grinding machine. It will here be understood that the construction of the discharge end portion 10, the perforated grinder plate 18 and the clamping collar 19, as illustrated in FIG. 3, are conventional and, as such, form no part of the present invention.

Detachably secured to the outer end portion 13 of the casing 11, as by means of cap screws 20, is a hollow nozzle extension 21. This nozzle extension is formed with an axially extending passage or opening 22 of generally rectangular or square cross-section which forms a longitudinal continuation of the discharge end of the passage 15 of the main casing 11.

Detachably mounted within the main casing 11, toward the discharge end portion 13 thereof, is a core device generally indicated by the numeral 23. This core device comprises an annular supporting frame 24 which is sized and shaped to snugly, but detachably fit within the confines of an annular, cylindrical recess 25 formed in the inner wall 14 of the main casing 11 intermediate the ends thereof. Toward this end, the annular frame 24 of the core device is formed with a feathered inner edge 26 and a progressively increasing cross-sectional thickness toward its outer edge, whereby to fill and conform as closely as possible to the cross-sectional dimensions of the annular recess 25. The supporting frame or ring 24 is formed on its outer surface with a pair of diametrically opposed, relatively shallow, indexing indentations or recesses 27 which are arranged to register with and receive therein the tips of a pair of set screws 28 threadedly carried in tapped bores 29 extending radially through the wall of the casing 11. Thus, the set screws 28 function to securely hold the annular frame 24 of the core device in a properly indexed position within the recess 25 of the casing. The set screws may also be loosened to permit the annular frame 24 to be removed axially and rearwardly of the passage 15.

The core device further includes a cross arm or spider 30 which is welded or otherwise rigidly secured to the outer annular frame 24 and which extends radially inwardly thereof. Welded to the cross arm 30 are the slotted inner ends of five, longitudinally extending rods 31. The rods 31 are of a length to extend fully through the outer end portion 13 of the main casing 11 and through the passage 22 of the nozzle extension when the supporting frame 24 occupies the recess 25. The rods 31 are arranged in relatively spaced relation to one another and to the inner wall of the casing 11 and the nozzle extension 21. The rods 31 are also preferably formed with longitudinally tapered intermediate portions 31a for a purpose which will be hereinafter explained. As will be noted in FIG. 3, the inner edges of the cross arm 30 and the inner or butt ends of the rods 31 are rounded and streamlined in the direction of flow of the ground meat through the passage 15 of the casing 11, so as not to present any flat surfaces which would tend to accumulate meat particles thereon, or otherwise retard the free and smooth flow of ground meat through the passage 15 of the casing.

Positioned around the intermediate and outer end portion of the main casing 11 is a sectional, electrically energized cabinet-type heater. The heater comprises a thermally insulated, rectangular cabinet 32 formed by upper and lower sections 32a and 32b, respectively. The upper and lower sections of the cabinet 32 are connected along one side thereof by a piano-type hinge 33 which permits the sections to be swung, as indicated by the broken lines of FIG. 5, relatively apart, to remove the heater from the extrusion nozzle when it is desired to dismantle the extrusion nozzle. Preferably, the lower section 32b of the heater cabinet is provided with an internally threaded socket fitting 34 into which may be threaded the upper end portion of a tubular, supporting pedestal or post member 35. The post member 35 may have its lower end, not shown, supported on a floor or other horizontal support surface, whereby to furnish support for the heater 32. Also, the lower section 32b is provided with a downwardly extending drain tube 36 through which water accumulated in the cabinet as a result of condensation on the casing 11 may pass by gravity out of the cabinet.

The end walls of the cabinet sections 32a and 32b are formed with registering, semi-circular openings 37 which relatively closely fit the adjacent outer surfaces of the casing 11 of the extrusion nozzle when the cabinet sections occupy their closed positions as shown in the drawings. The upper and lower cabinet sections are provided with electrically energized, elongated bar or strip-type heating elements 38a and 38b. As shown most clearly in FIGS. 5 and 6, the heating elements 37a and 37b are supported in diagonally opposite corners of the cabinet 32 by means of attaching brackets 39 which are welded or otherwise rigidly secured to the inner walls of the cabinet sections 32a and 32b. Each of the heating elements is provided with a pair of binding post terminals 40 to which are connected remotely extending, flexible lead wires 41, 42, 43 and 44. Preferably, the lead wires extend outwardly through grommeted openings 45 provided in the outermost end walls of the cabinet 32 and thence upwardly to a junction box 46 mounted on the upper wall of the cabinet section 32a. Mounted adjacent the junction box 46 is the housing 47 of a bellows or diaphragm-actuated thermostatic switch 48. The switch 48 includes the usual remotely extending capillary tube 49 which leads to a closed, temperature-sensing bulb 50 mounted on a spring bracket 51 secured to the inner wall of the upper cabinet section 32a. As will be noted particularly in FIG. 5, the temperature sensing bulb 50 is arranged in the upper cabinet section 32a so as to directly engage the outer surface of the casing 11 toward the outer end portion 13 thereof when the cabinet 32 is closed about the extension nozzle. Thus, the thermostatic switch is responsive primarily to the temperature of the metal casing 11 of the extrusion nozzle.

The electrical control circuit for the heater is illustrated diagrammatically in FIG. 7. Operating current is supplied by way of the power lines L1 and L2. The power line L1 is electrically connected with one side of the heating element 38a by the lead wire 41, while the second heating element 38b is connected to the line L1 by the lead wire 43. The opposite lead wires 42 and 44 for the heating elements 38a and 39b are electrically connected with a common terminal pole 60 which, in turn, is electrically connected by a lead wire 61 with one pole of the thermostatic switch 48. The opposite pole of the switch 48 is electrically connected with the power line L2 by the lead line 62. Electrically connected in parallel with the heating elements 38a and 38b is an indicator light 53 which is preferably visible at the top of the junction box 46, as shown in FIG. 1. The indicator light 53, is, of course, intended to signal the energization of either or both of the heating elements 38a and 38b.

In operation, the extrusion nozzle assembled as shown in FIG. 3, is securely clamped in position at the discharge end of the meat grinder by means of the collar or nut 19. The heating cabinet 32 is then closed around the intermediate and outer end portions of the main casing 11, and the power lines L1 and L2 are connected with a suitable power source by means of a remotely extending electrical plug connector 55. The control knob 56 of the thermostat 48 is then set for the desired temperature to maintain the casing 11 at a temperature sufficiently above freezing, so as to prevent the undesired accumulation of frost on the casing 11 and the nozzle extension 21 and the freezing of meat particles on the interior surfaces of the extrusion nozzle.

It should here be understood that the present extrusion nozzle is intended primarily for use and operation upon ground meat in a semi-frozen condition. In this regard, it has been found that beef which is refrigerated to a temperature of from 28°–30° F. prior to and during grinding and extruding does not tend to lose its natural juices and is less likely to become contaminated or spoiled than if maintained at temperatures above freezing. Also, the relatively reduced temperatures of the meat during grinding and extruding greatly facilitate the forming and subsequent quick freezing of hamburger patties formed therefrom.

When assembled on the meat grinder as previously indicated, the extrusion nozzle is in condition to receive and form the ground meat discharged from the grinder into a continuous, relatively dense column having a plurality of openings or perforations extending longitudinally therethrough and corresponding in size and number to the rods 31. As will be understood, the tapered internal passage 15 of the casing 11 becomes filled with the semi-frozen ground meat from the grinding machine, and upon continued operation of the grinding machine the meat is substantially compressed and compacted as it passes through the relatively restricted outer end portion of the passage 15. The taper of the passage 15 and the interposition of the core device 23 causes the column of ground meat to reach maximum radial compression and compaction in the region of the outlet opening 16 of the casing. Due to the inherent flexibility or resiliency of the semi-frozen, ground meat, it naturally tends to expand slightly in a radial direction when it is relieved of the compression forces imposed thereon by the extrusion nozzle. In order to minimize somewhat the dimensional instability of the column of meat as it leaves the nozzle extension 21, the intermediate region 31a of the rods of the core device are tapered in the direction of flow of the meat through the outlet opening 16 of the casing 11. The rather slight reduction in the diameter of the rods 31 permits a corresponding reduction in the diameter of the perforations formed in the meat column, thus relieving the radial compaction forces and stresses which would otherwise tend to make the column of meat expand or "grow" radially as it clears the outer end of the nozzle extension 21.

The cabinet-type heater functions to heat and maintain the extrusion nozzle at a temperature sufficiently high to prevent frosting of the interior surfaces of the extrusion nozzle and consequent freezing of meat particles thereon. At the same time, the temperature of the extrusion nozzle is regulated so as not to materially increase the temperature of the ground meat as it passes through the extrusion nozzle. Ideally, the walls of the nozzle are heated sufficiently so that the outer regions of the semi-frozen meat coming in contact therewith will be slightly thawed and moistened. This naturally increases the lubricity of the meat column and greatly reduces the frictional resistance which would otherwise be encountered when attempting to extrude semi-frozen meat through an unheated extrusion nozzle.

Following extrusion from the outlet of the nozzle extension 21, the continuous column of shaped, compacted and perforated meat may be easily cut or sliced transversely to form individual ground meat patties which may then be packaged and quick frozen for subsequent shipment and/or storage prior to cooking thereof.

In view of the foregoing, it will be seen that the present invention provides an improved extrusion nozzle for meat grinders which is characterized by an easy to maintain and sanitize sectional construction, and a mechanical efficiency which enables it to be used particularly in the shaping and forming of ground meat in a semi or soft frozen condition. While a single preferred embodiment of the invention has been illustrated and described in detail, it will be understood that various modifications as to details of construction and design may be resorted to without departing from the scope of the following claims.

Having thus described this invention, what is claimed is:

1. A sectional extrusion nozzle for a meat grinder comprising a hollow casing for detachable connection with the discharge end of a meat grinder, said casing having an inner wall structure defining an internal, generally frusto-conical passage having a wider inlet end and a relatively narrower discharge end, the inner wall of said casing being formed intermediate the ends of said passage with an annular, cylindrical recess; a hollow nozzle extension detachably connected with said casing adjacent the narrower end of said passage and having an opening extending longitudinally therethrough, the opening of said extension being arranged in direct communication with and forming a longitudinal continuation of the discharge end of said passage; and a core device including an annular supporting frame detachably carried in the annular recess formed in the inner wall of said casing and a plurality of elongated, generally parallel rods extending outwardly from said frame and axially through the discharge end of said passage and completely through the opening of said extension, said rods being disposed in relatively spaced relation to one another and to the walls of said casing and said extension.

2. A sectional extrusion nozzle according to claim 1, including a sectional electrically energizable heater cabinet encompassing at least a portion of said casing and operable to heat the latter.

3. A sectional extrusion nozzle according to claim 1, wherein said casing is formed adjacent the wider end of the passage thereof with a diametrically enlarged mounting flange for clamped engagement with the discharge end of a meat grinder.

4. A sectional extrusion nozzle according to claim 1, wherein the discharge end of the passage of said casing and the opening of said extension are generally rectangular in cross-section.

5. A sectional extrusion nozzle according to claim 1, wherein the rods of said core device are tapered longitudinally from said supporting frame toward the opening of said nozzle extension.

6. A sectional extrusion nozzle according to claim 1, wherein the annular supporting frame of said core device is formed with a feathered edge facing the inlet end of the passage of said casing.

References Cited

UNITED STATES PATENTS

| | | | |
|---|---|---|---|
| 2,208,651 | 7/1940 | Wallace | 17—32 X |
| 2,580,726 | 1/1952 | Brewer. | |
| 2,635,561 | 4/1953 | Elsaesser | 107—14 |
| 2,670,296 | 2/1954 | Tansley | 99—194 |
| 2,953,461 | 9/1960 | Prohaska | 99—109 |
| 3,229,615 | 1/1966 | Rattner | 99—109 X |

LUCIE H. LAUDENSLAGER, Primary Examiner

U.S. Cl. X.R.

99—109, 194; 107—1, 14